United States Patent
Boddy (10) Patent No.: US 7,046,127 B2
(45) Date of Patent: May 16, 2006

(54) ELECTRONIC REVERSING AID WITH WIRELESS TRANSMITTER AND RECEIVER

(76) Inventor: Terence Boddy, North Tree Route, Fyvie, Turriff, Aberdeen (GB) AB53 8NQ (*) Notice: Subject to any disclaimer, the term of this patent is extended or adjusted under 35 U.S.C. 154(b) by 0 days.

(21) Appl. No.: 10/791,824

(22) Filed: Mar. 4, 2004

(65) Prior Publication Data
US 2005/0024191 A1 Feb. 3, 2005

Related U.S. Application Data

(63) Continuation-in-part of application No. 09/567,224, filed on May 9, 2000, now abandoned.

(51) Int. Cl.
*B60Q 1/00* (2006.01)

(52) U.S. Cl. ............... 340/435; 340/436; 340/901; 340/426.17; 340/568.1

(58) Field of Classification Search ........... 340/435, 340/436, 901, 426.17, 477, 479, 431, 458, 340/641, 642, 468, 469, 555, 568.1
See application file for complete search history.

(56) References Cited

U.S. PATENT DOCUMENTS

| | | | | |
|---|---|---|---|---|
| 3,732,555 A | * | 5/1973 | Strenglein | 340/426.17 |
| 4,319,220 A | * | 3/1982 | Pappas et al. | 340/426 |
| 5,087,918 A | * | 2/1992 | May et al. | 340/435 |
| 5,164,729 A | * | 11/1992 | Decker et al. | 342/20 |
| 5,331,561 A | | 7/1994 | Barrett et al. | 364/447 |
| 5,347,273 A | * | 9/1994 | Katiraie | 340/903 |
| 5,574,426 A | * | 11/1996 | Shisgal et al. | 340/436 |
| 5,666,103 A | * | 9/1997 | Davis, Jr. | 340/479 |
| 5,708,411 A | * | 1/1998 | Hill | 340/447 |
| 6,133,826 A | * | 10/2000 | Sparling | 340/436 |
| 6,217,200 B1 | * | 4/2001 | Huffman | 362/477 |
| 6,339,369 B1 | * | 1/2002 | Paranjpe | 340/436 |
| 6,400,308 B1 | * | 6/2002 | Bell et al. | 342/71 |

FOREIGN PATENT DOCUMENTS

| | | |
|---|---|---|
| EP | 0357855 A1 | 3/1990 |
| EP | 0367404 A2 | 5/1990 |
| EP | 0407300 A1 | 1/1991 |
| GB | 2050745 A | 1/1981 |
| GB | 2220512 A | 1/1990 |

(Continued)

OTHER PUBLICATIONS

BMW Accessories Catalogue, Jul. 1995, p. 49, item 10.

*Primary Examiner*—Jeffery Hofsass
*Assistant Examiner*—Daniel Previl
(74) *Attorney, Agent, or Firm*—Jacobson Holman PLLC (57) ABSTRACT

This invention provides a reversing aid to assist in indicating the proximity between a vehicle and surrounding objects. The sensors provided on the vehicle detect the proximity of an object and pass a signal to a transmitter. The transmitter provides a wireless signal to a receiver located near the driver of the vehicle to provide an indication of the distance between the vehicle and the object. By providing a wireless transmission, the reversing aid can be fitted to vehicles without the need to accommodate a signal path in the wiring loom from the rear of the vehicle to the cab of the vehicle. The transmitter is provided as a demountable apparatus so that it can be shifted to cooperate with sensors provided on a towed vehicle such as a trailer and continue to cooperate with the receiver.

24 Claims, 7 Drawing Sheets

FOREIGN PATENT DOCUMENTS

| | | | |
|---|---|---|---|
| GB | 2220512 | * | 10/1990 |
| GB | 2243010 A | | 10/1991 |
| GB | 2260814 A | | 4/1993 |
| GB | 2289999 A | | 12/1995 |
| GB | 2293038 A | | 3/1996 |
| GB | 2307810 A | | 6/1997 |

* cited by examiner

ELECTRONIC REVERSING AID WITH WIRELESS TRANSMITTER AND RECEIVER

This is a Continuation-in-Part of 09/567,224 filed May 9, 2000.

FIELD OF THE INVENTION

This invention relates to an electronic reversing aid with a, wireless transmitter arid receiver. Although generally described as a reversing aid, the technology may be used in alternative placements on the vehicle although still intended as an indicator of distance between a vehicle and an object.

BACKGROUND TO THE INVENTION

The operation of motor vehicles often requires the user to exercise considerable judgment in the manoeuvring of vehicles with respect to other objects such as other vehicles or static objects. This is particularly apparent when a vehicle is in reverse negotiating a parking space, driveway or similar. While in reverse, the driver is required to exercise judgment in respect of the most distant corner of the vehicle from the driver's own position and also has an obscured view of objects that may be in the path. Although the use of side mirrors can assist, there are still significant blind spots.

It is already known for some vehicles to provide sensors to sense surrounding objects and provide the driver some form of indication of the existence of the object or, more preferably, the proximity of the object. Typically these may comprise proximity sensors placed in locations such as at the rear corners of a vehicle and communicating through the vehicle-wiring frame to some form of indicator near the driver.

One of the disadvantages of the present products is that they provide insufficient flexibility in use. Such sensors are generally permanently fitted to a particular vehicle and use the vehicles own wiring system such that it is not convenient to utilize all or portions of the system in another vehicle. Therefore, a driver with multiple vehicles needs to consider the purchase of multiple systems and mounting to each individual vehicle.

A significantly greater difficulty is incurred when a trailer, caravan or other towed item is fitted to the vehicle. The vehicles rearwardly mounted sensors can do no more than indicate the location of the towed object and the system needs to either be ignored or switched off during towing. Of course, reversing with a trailer, caravan or other towed object fitted is considerably more difficult both in terms of judgment and feasibility and a sensor and indicator arrangement would be of considerably greater use that could be fitted to the towed vehicle.

There are difficulties with the present apparatus in fitting such systems to towed vehicles. While it was possible to mount sensors on the rear of a towed vehicle, there is generally no convenient wiring system that may be utilized to connect the sensors to an indicator located by the driver. Such systems are difficult to retrofit to existing towed vehicles that have not been designed with wiring to accommodate such apparatus. Furthermore, on linking the wiring to the vehicle itself, the electrical connections between vehicles available for towed vehicles are relatively few. These are often already saturated in the provision of power and signals to indicators, brake lights, parking lights and other functions. This may cause considerable difficulty in accommodating a sensor signal through the towed vehicle.

The above-described known reversing aids that utilize sensors placed on the rear of a vehicle and attached to some form of alarm within the cabin of the vehicle are generally incorporated in new vehicles and hard wired into the vehicles such that they have no portability, retro-fittability and are redundant once any form of trailer, caravan or the item is towed behind the vehicle. In fact, existing systems would normally need to be disabled upon fitment of vehicle to be towed to stop the sensors continuously sensing the towed vehicle. In the case of recreational vehicles, trucking fleets or even typical cars that may occasionally tow trailers or caravans, the existing systems do not provide the portability nor the adaption to allow components to be swapped from one vehicle to another or to conveniently allow sensing behind the towed vehicle rather than the vehicle itself when in the towed configuration.

OBJECT OF THE INVENTION

It is an object of the present invention to overcome some of the difficulties and disadvantages with the prior art. Some embodiments provide an electronic reversing aid with a wireless transmitter and receiver. Some embodiments provide switching between sensors on a towing vehicle and a towed vehicle. As a minimum, it is an object to provide the public with a useful choice.

SUMMARY OF THE INVENTION

Accordingly, in the first aspect, the invention may broadly be said to consist in a system for detecting an object while reversing a vehicle and providing an indication to the driver of the proximity of the object comprising sensor means for detecting an object in the path of a reversing vehicle, radio frequency transmitter means for transmitting a signal representative of the distance of the object from the vehicle, and radio frequency receiver means for receiving the signal from the transmitter means and generating a visual and/or audible indication to the driver of the proximity of the object relative to the vehicle.

Accordingly, in a second aspect, the invention may broadly be said to consist in a reversing aid for fitment to a vehicle comprising:
  at least one sensor for fitment on or adjacent an exterior of the vehicle to sense the proximity of an object;
  a wireless transmitter in communication with said sensor to receive a signal representative of the proximity from said sensor and transmit a further representative signal;
  a receiver to receive said representative signal from said transmitter; and
  indicating means in communication with said receiver to provide a driver with an indication of the proximity of an object in accordance with the signal received by said receiver.

Preferably at least said wireless transmitter is demountable from a fixing to said vehicle.

Preferably said demountable fixing comprises a mounting bracket attachable to a vehicle to receive said transmitter to accommodate connection between said transmitter and at least one signal carrying communication path from said at least one sensor.

Accordingly, in a third aspect, the invention may broadly be said to consist in an object proximity detection system for a vehicle including:
  at least one proximity sensor unit fittable to an exterior portion of a vehicle;

a wireless transmitter unit in communication with said proximity sensor to receive signals from said sensor and transmit signals in accordance with the detection by the sensor:

at least one receiver unit capable of receiving wireless transmissions from said wireless transmitter:

an indicating means communication with said receiver to provide a driver with an indication of objects sensed by the sensors as transmitted by the transmitter and received by the receiver: and wherein said sensor and said transmitter are incorporated in a housing for fitment to a vehicle together.

Preferably said housing is substantially secure against the ingress of water in use. Preferably said housing includes a front plate on or in which said at least one sensor may be mounted. Preferably said transmitter is enclosed in said housing behind said front plate.

Preferably said housing includes fitment means for fitment to a bumper of a vehicle. Preferably at least one wire for connection to a power source extends from said housing for attachment to a power source on said vehicle.

Accordingly, in a fourth aspect, the invention may broadly be said to consist in object proximity detection system for a vehicle including:

at least one proximity sensor for attachment to an exterior of a vehicle:

at least one transmitter unit in communication with said sensor to transmit signals in accordance with objects detected by said sensor;

at least one receiver unit to receive signals from said transmitter;

at least one indicating means to provide a driver within indication of objects sensed by said sensor; and wherein said receiver unit includes switching means such that said indicating means may provide a driver with an indication of objects sensed by sensors on a towed vehicle and discontinue indicating objects sensed by proximity sensors on the towing vehicle.

Preferably said system includes a receiver within cabin of the vehicle connectable to sensors on a rear of a vehicle and, in a second configuration able to receive and indicate signals from sensors on a towed vehicle.

Preferably said switching means configures said receiver to receive signals from sensors on said towed vehicle via a wireless transmitter.

BRIEF DESCRIPTION OF THE DRAWINGS

The invention will now be described with reference to the following drawings in which.

DETAILED DESCRIPTION OF PREFERRED EMBODIMENTS

This invention provides an electronic reversing aid with wireless transmitter and receiver. Although generally referred to as a reversing aid, the apparatus may be used for placements other than detecting objects behind a motor vehicle and can be used for object sensing around a vehicle.

Figure 1:
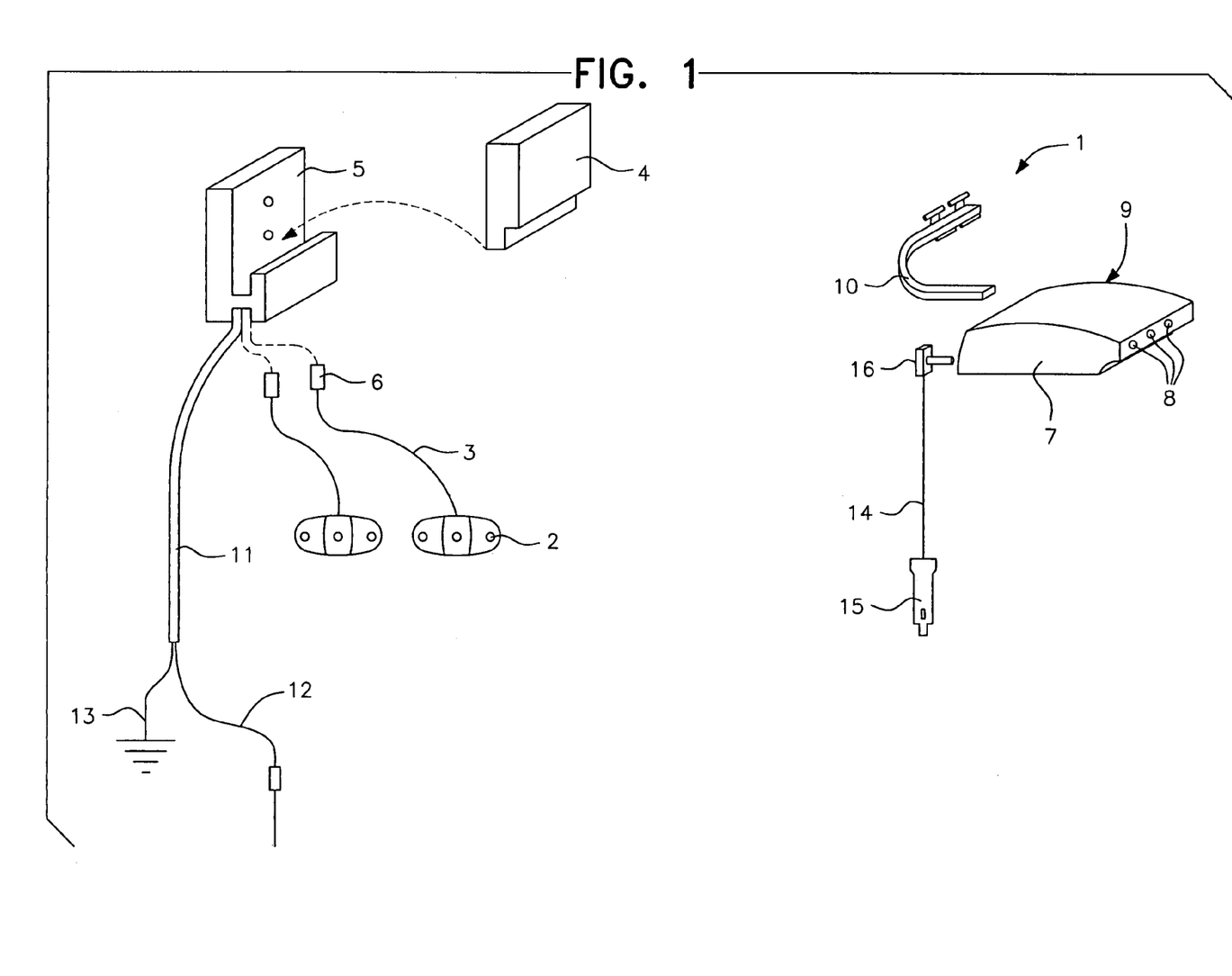
FIG. 1 is a schematic diagram of items forming a first preferred embodiment of the system.

A preferred embodiment of an apparatus is shown in FIG. 1. The reversing aid 1 includes at least one sensor 2 that is locatable on a vehicle to sense the proximity of objects. Such sensors 2 can utilize a variety of methods of detection such as ultrasound or similar and are already commercially available.

The sensor 2 is connected to a communication path 3 for connection to a transmitter 4. As shown in this preferred embodiment of FIG. 1, the transmitter 4 is itself fitted into a mounting bracket 5 and it will be appreciated that the connector 6 on the communication path 3 may be fitted directly to the transmitter 4 or to a connection on the mounting bracket 5 that itself connects to the transmitter 4.

It is merely sufficient that the transmitter 4 receives a signal from the sensor 2 along the communication path 3 that is indicative of the proximity of an object to the sensor 2.

Upon receiving a signal, the transmitter 4 can then provide a wireless signal to a receiver 7. This receiver is provided with or communicates with indicating means 8 so as to alert a driver that an object is within proximity.

As shown in this preferred embodiment, the receiver 7 and the indicating means 8 may be combined in a single housing 9. This is provided for simplicity although these components can be separately provided if desired.

As it is intended that the receiver or at least the indicating means 8 must be in proximity with the driver, a suitable mounting 10 can be provided to fit onto a windscreen or similar so that the unit can be mounted at a convenient position to the driver.

The indicating means 8 can provide visual, audible or both forms of indication.

For simplicity of fitment, the mounting bracket 5 may also provide an electrical connection to a vehicle power supply such as wires 11 that can connect to both a power wire 12 and an earth 13 onto the body of the vehicle. This provides power directly to the transmitter 4 although it will be appreciated that the transmitter may be provided with its own power source such as battery or other power if desired.

Similarly, the receiver 7 may be provided with its own power source or, as shown in this preferred embodiment, connected by a power lead 14 to a suitable power source from the vehicle. This preferred embodiment uses an adapter 15 intended for fitment to a vehicle's cigarette lighter as being a suitable source of power for the receiver 7. Of course, the receiver may be wired directly to the vehicle power supply rather than through any form of adapter if a user does not wish to take the vehicle cigarette lighter out of operation. Regardless of the manner in which the power source is supplied to the receiver 7, it is preferred that it be disconnectable through a connection such as connection 16 so as to make the receiver 7 transportable to another vehicle if desired.

Figure 2:
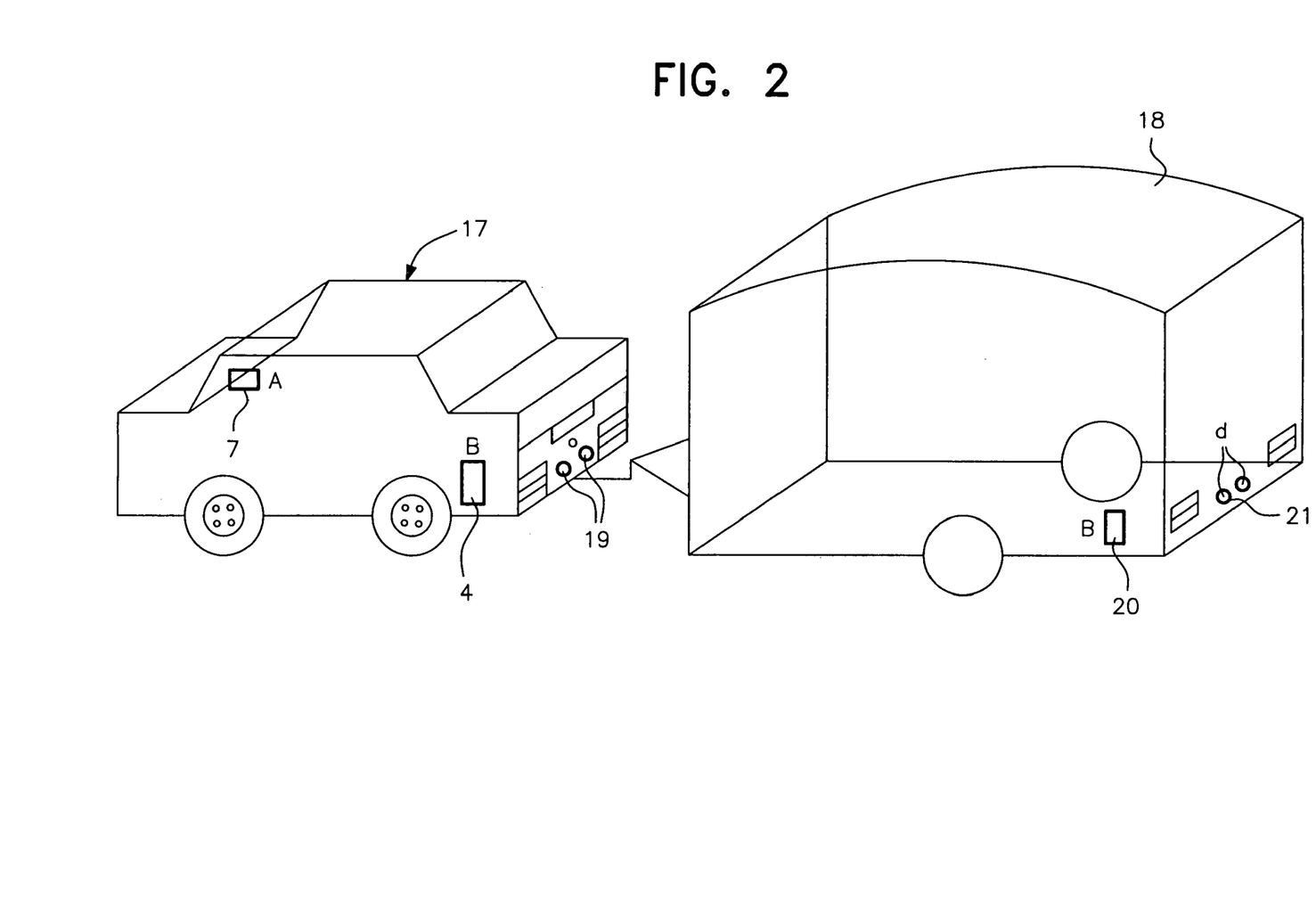
FIG. 2 is a perspective view of a vehicle and towed object demonstrating placement of the apparatus of FIG. 1.

Referring to FIG. 2, the apparatus 1 is shown generally as it may be fitted to a vehicle 17 and/or a towed vehicle 18 such as a trailer or caravan or similar.

As shown in FIG. 2, the receiver 7 may reside in the cab of the vehicle near to the driver. If the item is used on the vehicle 17 alone, a sensor 2 may be provided as a pair of sensors 19 attached on or adjacent a rear panel of the vehicle 17. The transmitter 4 may be mounted within its bracket 5 in the boot of the vehicle 17.

The apparatus 1 is intended to provide easy and convenient fitment to a vehicle and also allow some portability to other vehicles.

Referring to the apparatus as shown in FIG. 1 and its placement as shown in FIG. 2, it will be appreciated that the receiver 7 can easily be provided in a portable fashion for mounting and dismounting in the cab of the vehicle. The receiver can easily be taken by a user to another vehicle with or without taking the power supply lead 14 and the mounting bracket 10. If desired, these items can be provided as additional sets for fitment to further vehicles.

The mounting 5 to provide a mounting bracket for the transmitter 4 also allows the transmitter 4 to be easily detached and fitted to a similar mounting bracket in an alternative vehicle.

The sensors 18 as shown in FIG. 2 can be permanently fitted to the vehicle 17 or, if desired, also demountable from the vehicle. However, as the sensors need to be wired to a location within the boot of the vehicle for attachment to the mounting bracket 5, a more permanent fixing may be desired. The mounting bracket 5 retains the connection to the power supply for the transmitter 4 although again, the mounting bracket 5 can be made dismountable if desired and provided with extra connectors from the power supply 11 to the mounting bracket 5 for detachment.

There is generally little difficulty in finding an available power supply that may be sourced within a boot of a vehicle. Current is supplied to a variety of apparatus in the rear of the vehicle. The preferential connection may be to connect the lead 11 to a power wire 12 that is also used to supply power to a reversing light of a vehicle if fitted. This will ensure activation of the sensors 18 only upon selection of reverse gear with the switching to accommodate this already provided for the reversing light. Alternatively, the apparatus may be manually switched into effect by a user and use a more general power supply.

As described, the preferred embodiment of the apparatus can be fitted to a vehicle without any need to provide a wire from the sensors 18 that can carry a signal all the way to a placement in the cab of a vehicle 7. This facilitates fitment of the system to existing vehicles rather than the need to accommodate such a wire in the wiring loom of a vehicle upon manufacture.

Again referring to FIG. 2, the apparatus 1 as shown in FIG. 1 provides particular advantage when used in conjunction with a trailer 18. Upon fitment of the trailer 18, the existing sensors 18 on the rear of the vehicle and any permanent installation of a reversing aid will become redundant. However, the present invention allows the transmitter 4 to be relocated to an alternative position 20 on the trailer 18. This can be done to cooperate with an alternative pair of sensors 21 already fitted to the trailer 18 or, if desired, dismounting and relocation of the sensors 19 from the vehicle to the positions on the trailer 18 as shown by 21.

In performing a shift of the transmitter to the trailer 18, there is no need to accommodate any signal connection through the conventional vehicle to trailer electrical socket. Such sockets are provided with limited pins that may not accommodate an extra signal. Furthermore, such feature would generally need to be accommodated in both the trailer and the vehicle upon manufacture rather than allowing for retrofit to both the vehicle and trailer as provided by this preferred embodiment.

Figure 3A:
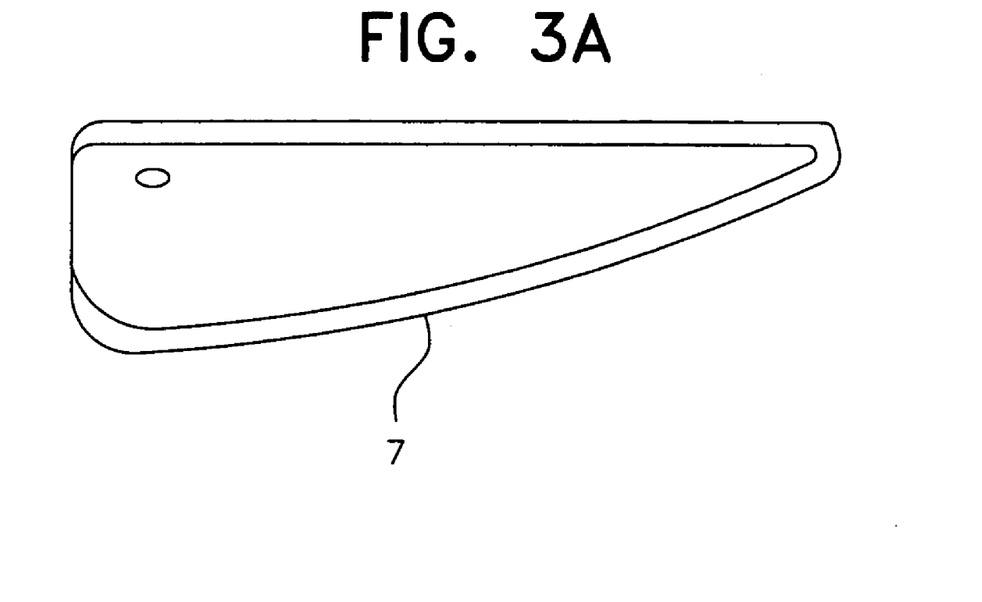
FIGS. 3A and 3B are side and plan elevational views of a receiver in accordance with the first preferred embodiment.
Figure 3B:
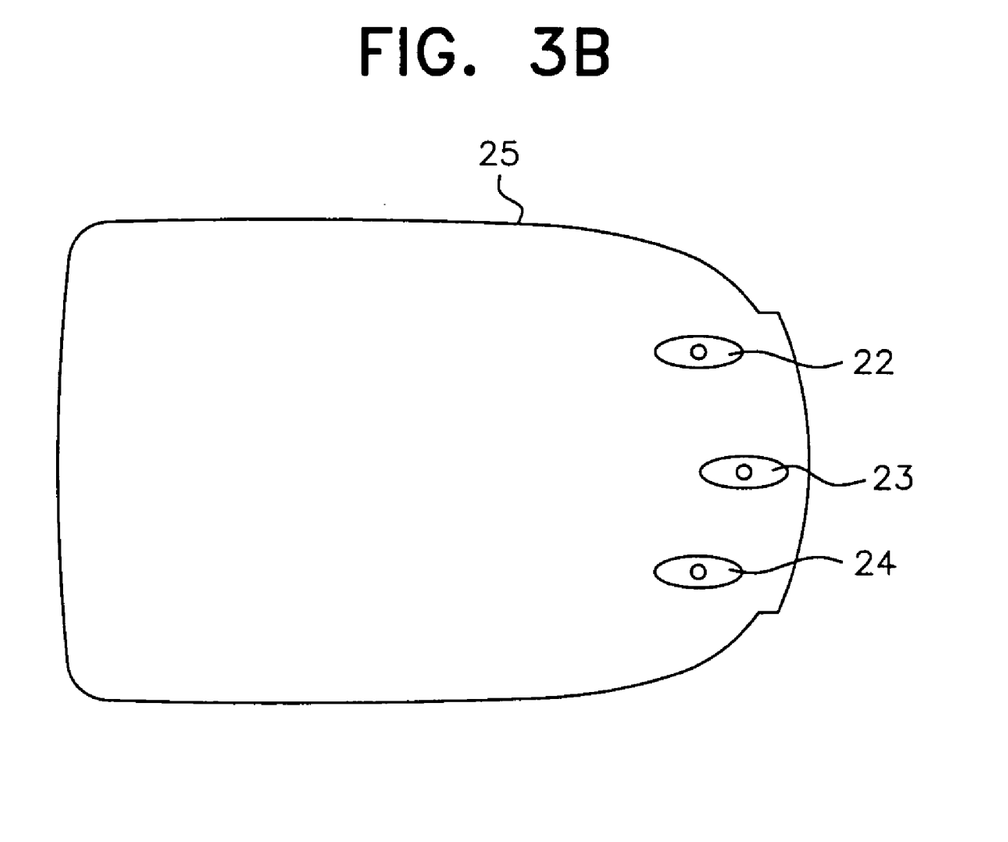

Referring to FIGS. 3A and 3B, the receiver 7 is shown in side and plan elevation respectively. This is a preferred embodiment of the receiver 7 and can be fitted adjacent an upper edge of a windscreen of a vehicle or fitted just above the dash of the vehicle if desired.

The indicating means 8 can comprise at least one and preferably more indicating lights 22, 23 and 24. Alternatively or, preferably additionally, an audible alarm 25 may also be incorporated within the receiver 7.

The operation of the sensors, transmitter and receiver can be determined by the particular needs of any specific arrangement. However, in this preferred system, the sensors provide signals through the transmitter 4 to the receiver 7 that vary according to the proximity of an object. This may be a continuously variable signal or a signal merely indicating intermittent steps in proximity. These may similarly be reflected by the indicating means 8 to provide a series of alternative indications of the proximity of an object.

Typically, the LED 22 may be activated when an object comes within one meter of the sensor 2. At the same time, the audible signal 25 may activate an intermittent sound. As the vehicle further approaches that object, the sound from the audible alarm 25 may increase in frequency and the additional LEDs 23 and 24 light up at appropriate smaller distances between the sensor 2 and the object. For example, the audible alarm may become substantially continuous and all three LEDs illuminate when the distance between the sensor 2 and the object is, for example, 40 cm.

As explained in relation to this preferred embodiment, the apparatus 1 is relatively easily fitted to a vehicle. The mounting 5 may be suitably fitted within the boot of a vehicle and the wired connection 11 connected to the reversing light wire 12 and earth wire 13 to the chassis. The sensors 2 can be fitted adjacent the rear of the vehicle and fitted by connector 6 directly into the mounting bracket 5. The transmitter 4 may be fitted into the mounting bracket 5 to complete that part of the installation.

The receiver 7 may be fitted by the mounting 10 directly onto the windscreen of the vehicle if desired. Similarly, the power supply 14 allows fitment directly to the cigarette lighter power source. No complicated wiring or difficult cabling is required within the vehicle.

If the system is provided with additional sensors, these may be fitted to a trailer with a further mounting bracket 5 similarly fitted into the trailer. Upon connection of the trailer, the transmitter 4 can simply be removed from the bracket 5 in the boot and slotted into the bracket on the trailer.

Figure 4:
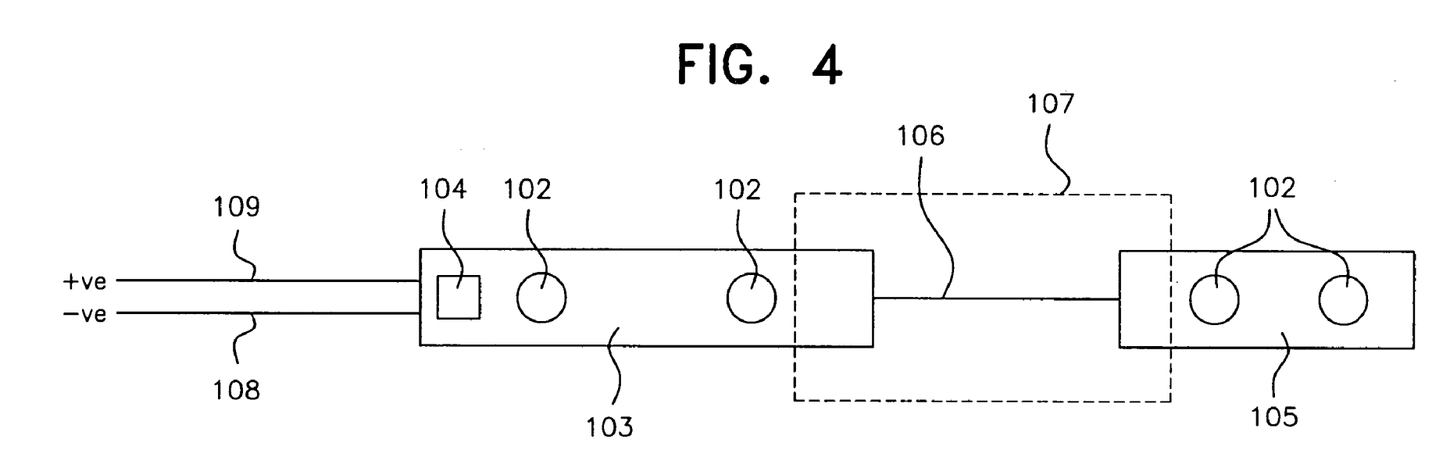
FIG. 4 is a perspective view of a housing for sensors and a transmitter in accordance with a second preferred embodiment of the invention.

Referring now to FIG. 4, a preferred second embodiment of a reversing aid in the form of an object proximity sensing system according to the invention is illustrated. At least one proximity sensor may be provided for fitment to a vehicle. Typically, a plurality of proximity sensors are likely to be provided. As already mentioned, proximity sensors suitable for reversing systems are available in the market as commercial items and the specific corporation of the sensors may vary according to the particular selection of sensor utilized. In general such sensors comprise a transmitter for emitting a signal such as an ultrasonic signal and a receiver for receiving a reflected signal from an object in the path of the transmitted signal from which the proximity of the object to the sensor can be detected. Where a plurality of sensors are provided, each sensor may detect a reflected signal from the same or a different sensor and the sensors may be connected to an electronic control device for receiving signals received by the sensors to determine the proximity of the object to the sensors. Such sensors are known and may comprise a transducer. This part of the system is conventional and the invention is not concerned with the construction and operation of the sensors.

The present invention mounts at least one sensor 102, or in this case as shown in FIG. 4, two sensors 102 within a housing 103. The housing 103 is intended to protect the sensors as well as providing an ease of fitment of the sensors to the exterior or a vehicle.

A transmitter and electronic control unit 104 may also be provided and, as shown in this preferred embodiment, contained within the housing 103 together with at least one of the sensors 102.

Figure 7:
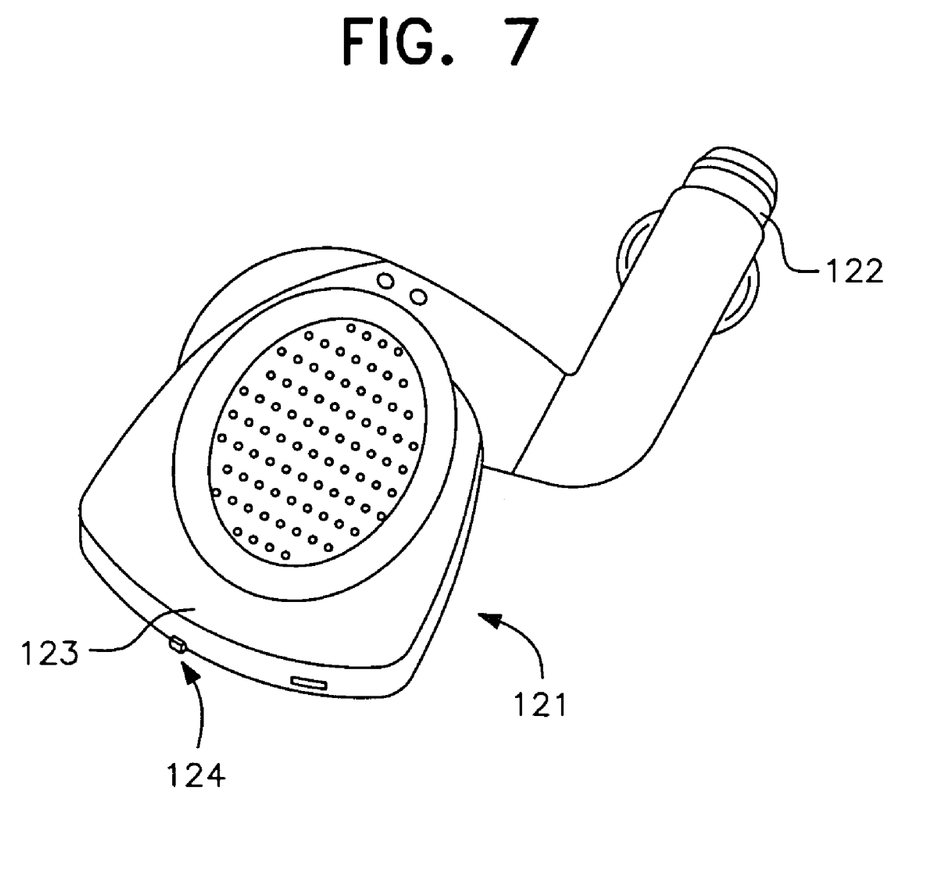
FIG. 7 is a perspective view of a receiver unit in accordance with the second preferred embodiment.

The transmitter 104 receives signals from the sensor 102 when activated and may transmit wireless signals on any preferred frequency to be received by a receiving unit 121 as shown in FIG. 7.

To power the electronic control unit, transmitter and sensors 102, a power source can be provided within the housing 103 as a self-contained power source or, more preferably, external connections in the form of at least one wire or preferably a positive and negative wires 108 and 109 may extend from the housing 103. The wires 108 and 109 may be provided with a suitable socket for fitment to a power source on the vehicle or wired into the vehicle. Numerous sources for battery power from a vehicle are provided around the vehicle and may provide suitable points of attachment.

In the embodiment shown in FIG. 4, the unit containing the sensors 102 in the form of the housing 103 is provided with a second similar housing 105 containing sensors 102 interconnected by a wire 106. The wile 106 provides communication from the sensors 102 in the housing 105 to the transmitter unit 104. It should be noted that this is a preferred embodiment where a single transmitter 104 is used to receive signals from all the sensors. In an alternative embodiment, a second transmitter unit could be provided in the housing 105 and its own power source may be provided so as to make the units independent rather than interconnected as shown. The reason for the configuration shown in FIG. 4 is that such units may be used on some recreational vehicles which may not provide a continuous rear surface on which a single uninterrupted unit may be fitted. For example, on some recreational vehicles, a step may be Provided in the middle of the rear of the vehicle and therefore, it may be better to provide the housing containing the sensors in two units as shown. An optional joining piece 107 may be provided to contain a number plate or any other desired artwork such as a manufacturer's logo.

It will be appreciated that the housing 103 may be filled directly to the rear of a vehicle so as to provide sensors to an existing vehicle without such apparatus. Alternatively, the housing could be fitted to a towed vehicle such as a caravan, trailer or a trailer unit of a truck.

To provide portability, it may be desirable to provide the housings such that they may be fitted to a vehicle and subsequently released. As the units are relatively light, fitment with any suitable mechanism such as double-sided tape, clamps, bolts or similar can be provided. The particular fitment mechanism is not shown in FIG. 4 although could be apparent to those skilled in the art.

Figure 5:
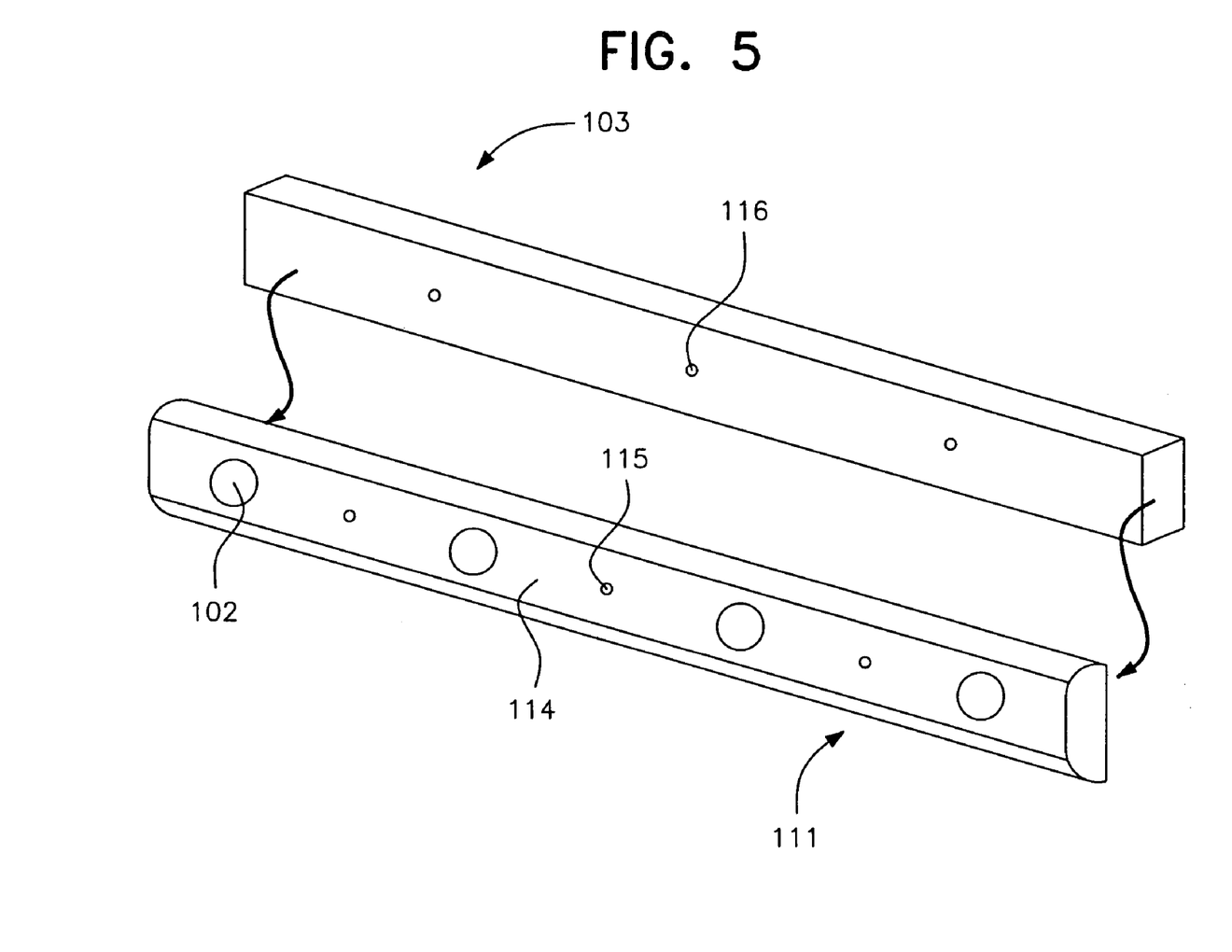
FIG. 5 is an elevational view of an alternative sensor and transmitter unit.

A further embodiment of the proximity sensor and housing is shown in FIG. 5. In this unit a longer continuous housing 103 is provided made from a front portion 111 having a front plate 114 and a rear portion 112.

The sensors 102 are fitted on or in the front plate 114 and the transmitter may be housed behind the front plate 114 to be enclosed by the rear portion 112 providing an enclosed housing. It will be appreciated that, when fitted to a vehicle, weather conditions may be adverse and the housing 103 formed by the adjoined pieces 111 and 112 is preferable substantially waterproof, at least against normal weather.

Fixing means to adjoin the front portion 111 and rear portion 112 are shown as portions 115 and 116 in which a cooperating fixing member such as a bolt, screw or similar may join the two portions.

The apparatus of FIG. 5 is shown in cross-section in FIG. 6, again in exploded fashion whereby the rear portion 112 is shown apart from the front portion 111. In use, the back portion 112 is fitted into the rear side of the front portion 111 to complete the housing.

Figure 6:
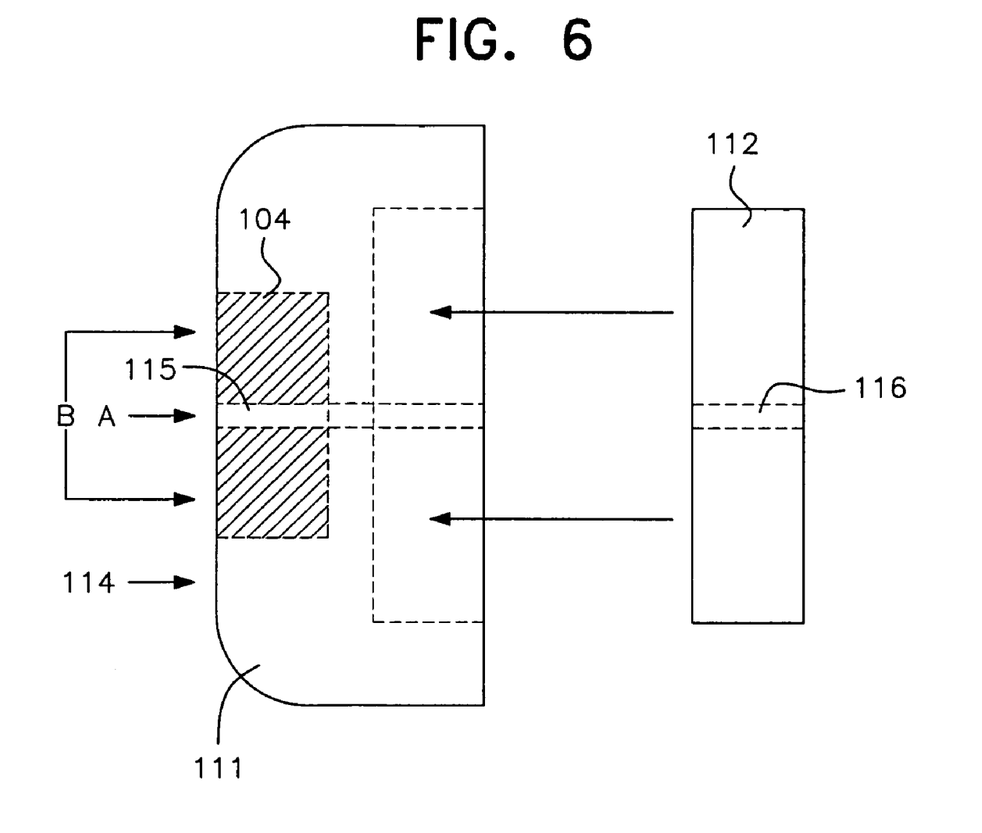
FIG. 6 is a cross-sectional view through the apparatus of FIG. 5.

A cross-section also shows the fitment of the transmitter 104 which may also include an electronic control unit to nest inside the enclosed overall housing 103.

Referring to FIG. 7, a receiving unit 121 for operation within the cabin of a vehicle is shown. This particular receiving unit 121 is shown as a portable unit fittable within the cabin and may include a connection 122 for fitment of the unit into a cigarette lighter socket within a vehicle. This provides convenient power source for operation of the receiver 121 although alternative power sources can be provided.

An indicating means 123 is provided with the receiver to provide the driver with an indication of the proximity of an object to the sensors. As with existing proximity sensor units, the indicating means may be a visual display or an audible display. This particular embodiment utilizes an audible display such that, as objects get closer to the proximity sensors, the frequency of sounds emitted by the audible indicator increases.

The receiver 121 is preferably provided with a control mechanism 124 that may include a switch. The switch is intended to allow alteration of the configuration of the receiver. When a receiver 121 is used with a normal vehicle, many such vehicles may be provided with their own proximity sensor units that may be wired through the vehicle body and to the receiving unit, 21. Alternatively, they may provide some wireless transmission to the receiver 121.

When the vehicle in question is towing a towed vehicle such as a trailer, caravan or similar, proximity sensors on the rear of the vehicle will often pick up the towed vehicle as being an object causing a continuous indication from the indication means. Hence often such reversing systems are disabled when a vehicle is towing even though this may be a time at which a driver is in greater danger when reversing due to unfamiliarity with reversing with the trailer or inability to see objects behind the trailer clearly.

In this present embodiment, a sensor unit may be fitted to the trailer and a switch operated such that the receiver 121 will now only indicate objects behind the trailer and either disconnect the signals from proximity sensors attached to the primary vehicle or, alternatively, disconnect the indication means from those primary sensors and instead only operatively connect the indication means to the sensors now on the towed vehicle.

Thus it can be seen that the invention provides an improved arrangement for a vehicle reversing system. More specifically, it can be seen that the invention provides a reversing aid or object locating aid for easy fitment to a vehicle. It overcomes some of the disadvantages of the permanent placement of existing systems and allows transfer of at least the most expensive components being the transmitter and receiver to an alternative vehicle to avoid duplication of cost in those components. It further allows easy fitment to a trailer or other towed apparatus of the transmitter in conjunction with relocation of the sensors or fitment of a further set of sensors. No reliance is made upon the vehicle to trailer electrical connection for transmission of the signals from the sensors.

The invention claimed is:

1. A system for detecting an object while reversing a vehicle and providing an indication to a driver of the proximity of the object comprising sensor means for detecting an object in the path of a reversing vehicle within a range of one meter of the vehicle, said sensor means comprising a plurality of proximity sensors for mounting in spaced apart relationship across the back of the vehicle, each sensor and arranged to transmit an ultrasonic signal and receive a reflected signal from an object in the path of a transmitted signal from the same sensor or a different sensor, electronic control means arranged to receive said reflected signals from said sensors and determine the proximity of said object to the vehicle, radio frequency transmitter means in communication with said electronic control means for transmitting a signal representative of the distance of the object detected by said sensor means from the vehicle, and radio frequency receiver means for receiving the signal from said transmitter means and generating a visual and/or audible indication to the driver of the proximity of the detected object relative to the vehicle, wherein said sensor means, electronic control means and transmitter means are combined in a detachable unit for transfer between vehicles.

2. The system according to claim 1 wherein a visual indication is provided by a plurality of lights which are progressively illuminated to indicate a reduction in the distance between the object and the vehicle.

3. The system according to claim 2 in which all the lights are illuminated at a predetermined distance between the object and the vehicle.

4. The system according to claim 1 wherein an audible indication is provided by intermittent beeps which become progressively faster to indicate a reduction in the distance between the object and the vehicle.

5. The system according to claim 4 in which the beep becomes a continuous tone at a predetermined distance between the object and the vehicle.

6. The system according to claim 1 in which said detachable unit is mountable on the back of the vehicle or the back of a trailer towed by the vehicle.

7. The system according to claim 1 in which said receiver means is mountable on the front of the vehicle.

8. The system according to claim 1 in which said detachable unit is switched on and monitors the distance to objects when reverse gear is selected.

9. The system according to claim 1 wherein said detachable unit is connected to power source in the vehicle.

10. The system according to claim 1 wherein said receiver means is detachably connectable to a cigarette lighter socket in the vehicle.

11. The system as claimed in claim 1 wherein said detachable unit is demountable from a fixing to the vehicle.

12. The system as claimed in claim 11 wherein said demountable fixing comprises a mounting bracket attachable to the vehicle.

13. The system according to claim 1 in which said detachable unit is transferable between a first vehicle and a second vehicle towed by the first vehicle such that, when the second vehicle is towed by the first vehicle, said receiver means provides an indication of the proximity of an object behind the second vehicle and, when the second vehicle is not towed by the first vehicle, said receiver means provides an indication of the proximity of an object behind the first vehicle.

14. An object proximity detection system for a vehicle including:
   a proximity sensor unit fittable to an exterior portion of a vehicle;
   said proximity sensor unit comprising a plurality of sensors;
   each sensor being arranged to transmit an ultrasonic signal and receive a reflected signal from an object in the path of a transmitted signal from the same sensor or a different sensor;
   an electronic control unit arranged to receive said reflected signals from said sensors and determine the proximity of said object to the vehicle;
   a wireless transmitter unit in communication with said electronic control unit and transmit signals in accordance with the proximity of said object;
   at least one receiver unit arranged to receive wireless transmissions from said wireless transmitter unit; and
   an indicating means in communication with said receiver unit to provide a driver with an indication of the proximity of said object sensed by the sensor unit as transmitted by the transmitter unit and received by the receiver unit; and
   wherein said sensor unit, said electronic control unit and said transmitter unit are incorporated in a housing for fitment to a vehicle together.

15. The object proximity detection system as claimed in claim 14 wherein said housing is substantially secure against the ingress of water in use.

16. The object proximity detection system as claimed in claim 14 wherein said housing includes a front plate on or in which said at least one sensor is mounted.

17. The object proximity detection system as claimed in claim 16 wherein said transmitter is enclosed in said housing behind said front plate.

18. The object proximity detection system as claimed in claim 14 wherein said housing includes fitment means for fitment to a bumper of a vehicle.

19. The object proximity detection system as claimed in claim 14 wherein at least one wire for connection to a power source extends from said housing for attachment to a power source on said vehicle.

20. The object proximity detection system according to claim 14 in which said sensor unit is operable to detect an object within a range of one meter.

21. The object proximity detection system according to claim 20 in which, in use, said sensor unit is operable to detect an object when reverse gear is selected.

22. An object proximity detection system for warning a driver of an object in the path of a vehicle while reversing, said system including:
   a first proximity sensor unit for attachment to an exterior of a first vehicle to detect an object behind the first vehicle;
   said first proximity sensor unit comprising
   a plurality of sensors;
   each sensor being arranged to transmit an ultrasonic signal and receive a reflected signal from an object in the path of a transmitted signal from the same sensor or a different sensor;

an electronic controller arranged to receive said reflected signals from said sensors and determine the proximity of said object to the first vehicle; and a wireless transmitter in communication with said controller to transmit signals in accordance with the proximity of the object detected by said first sensor unit;

a second proximity sensor unit for attachment to an exterior of a second vehicle being towed by the first vehicle to detect an object behind the second vehicle;

said first proximity sensor unit comprising a plurality of sensors;

each sensor being arranged to transmit an ultrasonic signal and receive a reflected signal from an object in the path of a transmitted signal from the same sensor or a different sensor;

an electronic controller arranged to receive said reflected signals from said sensors and determine the proximity of said object to the second vehicle; and a wireless transmitter in communication with said controller to transmit signals in accordance with the proximity of the object detected by said second sensor unit;

wherein the system further comprises a receiver unit to receive transmitted signals from said first and second sensor units;

at least one indicating means to provide a driver with an indication of objects sensed by said first and second sensor units; and wherein said receiver unit includes switching means such that said indicating means provides a driver with an indication of objects sensed by second sensor unit on the towed vehicle and discontinues indicating objects sensed by the first sensor unit on the towing vehicle.

23. The object proximity detection system according to claim 22 in which said sensor units are operable to detect an object within a range of one meter.

24. The object proximity detection system according to claim 23 in which, in use, each of said sensor units is operable to detect an object when reverse gear is selected.

* * * * *